(12) United States Patent
Ahmed et al.

(10) Patent No.: US 7,667,588 B2
(45) Date of Patent: Feb. 23, 2010

(54) CAGE TELEMETRY MODULE AND SYSTEM

(75) Inventors: Osman Ahmed, Hawthorn Woods, IL (US); Martin Glänzer, Perl-Besch (DE); Maximilian Fleischer, Höhenkirchan (DE); Peter Gulden, München (DE)

(73) Assignee: Siemens Industry, Inc., Alpharetta, GA (US)

( * ) Notice: Subject to any disclaimer, the term of this patent is extended or adjusted under 35 U.S.C. 154(b) by 686 days.

(21) Appl. No.: 10/951,450

(22) Filed: Sep. 27, 2004

(65) Prior Publication Data
US 2006/0071773 A1   Apr. 6, 2006

(51) Int. Cl.
*G08B 19/00* (2006.01)
(52) U.S. Cl. .............. 340/521; 340/539.22; 340/539.26
(58) Field of Classification Search ............. 340/539.22
See application file for complete search history.

(56) References Cited

U.S. PATENT DOCUMENTS

| | | | | |
|---|---|---|---|---|
| 4,448,150 A * | 5/1984 | Catsimpoolas | ............... | 119/455 |
| 5,562,537 A | 10/1996 | Zver et al. | | |
| 5,746,271 A * | 5/1998 | DeCosta | ....................... | 165/53 |
| 6,137,403 A | 10/2000 | Desrochers et al. | | |
| 6,199,575 B1 | 3/2001 | Widner | | |
| 6,393,913 B1 * | 5/2002 | Dyck et al. | ............... | 73/504.12 |
| 6,463,397 B1 * | 10/2002 | Cohen et al. | ................. | 702/140 |
| 6,471,853 B1 * | 10/2002 | Moscaritolo | .................. | 210/85 |
| 6,553,277 B1 * | 4/2003 | Yagisawa et al. | ............ | 700/204 |
| 6,625,500 B1 | 9/2003 | Li | | |
| 6,810,833 B2 * | 11/2004 | Bonner et al. | ................ | 119/455 |
| 6,894,491 B2 * | 5/2005 | Gotkis et al. | ................ | 324/230 |
| 6,927,688 B2 * | 8/2005 | Tice | ....................... | 340/539.26 |
| 6,963,279 B1 * | 11/2005 | Martinelli et al. | ....... | 340/539.22 |
| 6,970,699 B1 * | 11/2005 | Hagerty et al. | ............... | 455/419 |
| 6,998,980 B2 * | 2/2006 | Ingley et al. | ........... | 340/539.26 |
| 7,015,811 B2 * | 3/2006 | Decker et al. | ........... | 340/539.22 |
| 7,113,090 B1 * | 9/2006 | Saylor et al. | ........... | 340/539.18 |
| 2001/0025349 A1 | 9/2001 | Sharood et al. | | |
| 2001/0040509 A1 | 11/2001 | Dungan | | |
| 2004/0008651 A1 * | 1/2004 | Ahmed | ........................ | 370/338 |
| 2004/0019392 A1 | 1/2004 | Hirai | | |
| 2004/0088082 A1 | 5/2004 | Ahmed | | |
| 2004/0191626 A1 * | 9/2004 | Lewis et al. | .................. | 429/224 |
| 2005/0275530 A1 * | 12/2005 | Kates | .................... | 340/539.22 |

FOREIGN PATENT DOCUMENTS

| | | |
|---|---|---|
| EP | 0068289 | 1/1983 |
| EP | 1696371 | 8/2006 |
| WO | WO 99/57697 | 11/1999 |
| WO | WO 00/54237 | 9/2000 |
| WO | WO 01/26330 | 4/2001 |
| WO | WO 01/35190 | 5/2001 |
| WO | WO 01/93220 | 12/2001 |
| WO | WO 03/040753 | 5/2003 |
| WO | WO 2004/038525 | 5/2004 |

* cited by examiner

*Primary Examiner*—Eric M Blount
(74) *Attorney, Agent, or Firm*—Michael J. Wallace (57) ABSTRACT

A remote sensor assembly includes a silicon substrate, a plurality of microelectromechanical system (MEMS) sensors supported on the silicon substrate, a wireless communication circuit supported on the silicon substrate, and a processing device supported on the silicon substrate. The processing device is operable to obtain measurement values from at least one of plurality of MEMS sensors, perform a first filtering operation on the measurement values, and determine whether to cause the communication circuit to transmit a signal to an external device based on the first filtering operation.

21 Claims, 8 Drawing Sheets

CAGE TELEMETRY MODULE AND SYSTEM

CROSS REFERENCE TO RELATED APPLICATIONS

Cross-reference is made to co-pending U.S. patent application Ser. No. 10/951,451, entitled "Two Dimensional RF Location Method and Apparatus", filed Sep. 27, 2004, and to co-pending U.S. patent application Ser. No. 10/952,236, entitled "Cage Telemetry System Using Intermediate Transponders", filed Sep. 27, 2004.

FIELD OF THE INVENTION

The present invention relates generally to cage telemetry systems, and more particularly, systems for remotely obtaining sensor and/or location information for one or more cages.

BACKGROUND OF THE INVENTION

Environmental sensor and telemetry systems are used to monitor conditions in a variety of implementations. Temperature, humidity and light sensors are often employed in building control systems to assist in regulating a comfortable environment and/or increasing efficiency in power consumption. Smoke and/or heat sensors provide information regarding a possible hazardous condition.

While current sensing technology has proven adequate for building control systems, there has been an increasing need for sensing devices that are located in small spaces. For example, it is desirable to monitor conditions in animal cages that are used for the housing and care of research animals. However, typical temperature sensor devices and the like are too large to fit conveniently within an animal cage, particularly when several sensor devices are used to monitor various conditions. A further impediment to the use of generally available sensor devices in a cage environment is the significant wiring burden associated with such sensors. Each sensor typically requires wiring for both bias power and for signaling. If multiple sensors are used in an array of cages, the wiring requirements can be staggering.

Accordingly, there is a need for new arrangements for detecting various conditions in relatively small spaces, such as in animal cages, that has a reduced wiring requirement and reduced space requirement.

SUMMARY OF THE INVENTION

The present invention addresses the above described need, as well as others, by providing a remote sensor assembly that employs MEMS sensors, wireless communications and selective transmission of sensor values. The result of combining such elements is a sensor assembly that may be realized in a relatively small footprint, and has substantially reduced if not eliminated wiring requirements.

An embodiment of the invention is a remote sensor assembly that includes a silicon substrate, a plurality of microelectromechanical system (MEMS) sensors supported on the silicon substrate, a wireless communication circuit supported on the silicon substrate, and a processing device supported on the silicon substrate. The processing device is operable to obtain measurement values from at least one of plurality of MEMS sensors, perform a first filtering operation on the measurement values, and determine whether to cause the communication circuit to transmit a signal to an external device based on the first filtering operation.

The sensor assembly may be arranged in a cage of an animal. In such a case, the MEMS sensors would include those capable of sensing conditions that affect animal health or evidence physical condition.

Another embodiment of the invention is a method of obtaining sensor data from an animal cage. The method includes obtaining data regarding at least one environmental factor using a sensor assembly that is disposed proximal to the animal cage. The sensor assembly includes a silicon substrate, a plurality of microelectromechanical system (MEMS) sensors supported on the silicon substrate, a wireless communication circuit supported on the silicon substrate, and a processing device supported on the silicon substrate. The method further includes performing a first filtering operation on measurement values received from at least one of plurality of MEMS sensors, and determining whether to cause the communication circuit to transmit a signal to an external device based on the first filtering operation.

The reduced size afforded by MEMS technology and the reduced transmission requirements facilitated by the filtering and selective transmission operations allows for significant size reduction of the assembly. The smaller assembly makes use in animal cages practical.

The above described features and advantages, as well as others, will become more readily apparent to those of ordinary skill in the art by reference to the following detailed description and accompanying drawings.

DETAILED DESCRIPTION

Figure 1:
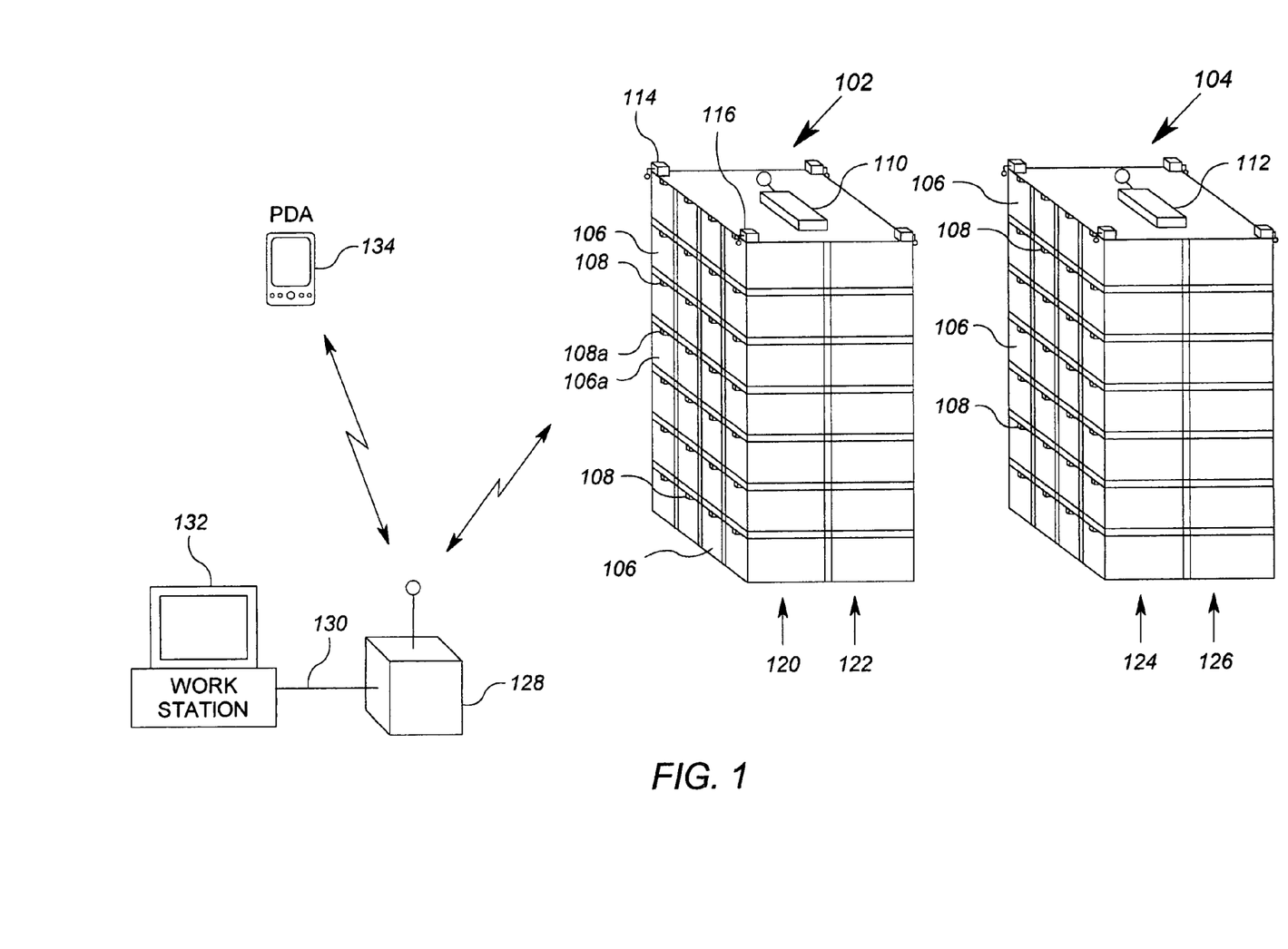
FIG. 1 shows a representative block diagram of an exemplary cage data system according to various inventive aspects described herein.

FIG. 1 shows a representative block diagram of an exemplary cage data system 100 according to various inventive aspects described herein. The cage data system 100 includes a plurality of racks 102, 104, each having a plurality of cages 106. The cages 106 are arranged in rows and columns in the racks 102 and 104. While the precise dimensions of the cages 106 are not important to disclosure of the invention, each cage 106 is an enclosure preferably having a rectangular footprint that has a size typical in the industry for the animal it is meant to contain. Each cage 106, as is known in the art, includes openings at least at the ends thereof to allow for ventilation. In accordance with this embodiment of the invention, each cage 106 also includes a wireless module 108 that is capable of providing telemetry information in conjunction with other elements of the system 100.

The cage data system 100 also includes a rack data transponder 110 associated with the first rack 102 and a rack data transponder 112 associated with the second rack 104. The first rack 102 is further divided into a first array 120 of cages 106 and a second array 122 of cages 106 arranged back to back. Similarly, the second rack 104 is divided into a first array 124 of cages 106 and a second array 126 of cages 106 arranged back to back. It will be appreciated that other embodiments will have additional racks, each rack preferably including a corresponding rack transponder and one or two arrays of cages.

As a consequence, each cage 106 and its corresponding wireless module 108 are associated with the rack on which they are located. Each cage 106 and its corresponding wireless module 108 are further associated with an the array of that rack. By way of example, the exemplary cage 106a, which is associated with the wireless module 108a, is located in the first array 120 of the first rack 102. In a preferred embodiment of the invention, the wireless modules 108 are operable to generate sensor information and location information, and communicate such information using wireless communications. However, it will be appreciated that at least some advantages over prior art systems may be realized in systems having wireless modules 108 that generate only location information or only sensor information in accordance with the present invention.

Figure 3:
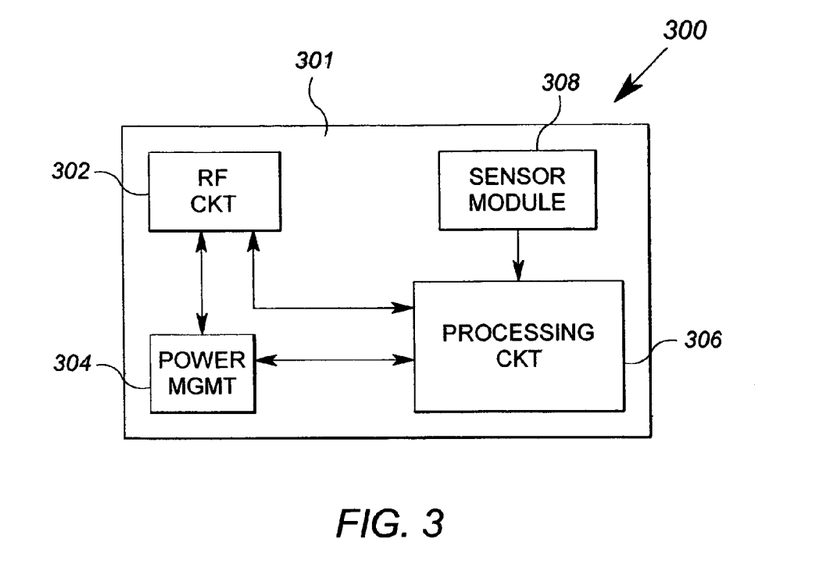
FIG. 3 shows a schematic block diagram of exemplary embodiment of a wireless module that may be used as one or more of the wireless modules of the system of FIG. 1.

In particular, in the embodiment described herein, each wireless module 108 includes an RF transceiver circuit and at least one sensor device (See e.g. the RF circuit 302 and the sensor module 308 of FIG. 3). The at least one sensor device is configured to sense one or more environmental or other conditions within or in the proximity of the cage. In the embodiment described herein, each wireless module 108 includes a temperature sensor, a humidity sensor, and one or more gas sensors. Such sensors can provide valuable information regarding the living conditions of the cage 106, and/or certain health traits of the animal within the cage 106.

Each wireless module 108 is operable to communicate sensor data to the rack data transponder 110 or 112 of the rack 102 or 104 on which the wireless module 108 is located. Thus, for example, the exemplary wireless module 108a communicates sensor data to the rack transponder 110 of the first rack 102.

The location information generated by each wireless module 108 relates to the position of the wireless module 108 within its rack. To this end, each array 120, 122, 124 and 126 of each rack 102 and 104 includes radio location transceiver systems that cooperate with each wireless module 108 to determine the location of the wireless module 108 within its array.

By way of example, the first rack 102 includes first and second radio location transceiver systems 114 and 116 spaced apart by a predetermined distance, and disposed proximate the first array 120. Each of the first and second radio location transceiver systems 114 and 116 are operable to selectively transmit a signal to a select one of the wireless modules 108, and receive a response signal from the select wireless module 108. Each of the first and second radio location transceiver systems 114 and 116 are further operable to generate distance-related information based on characteristics of the transmitted and responsive signal. Such distance-related information of the first and second transceiver systems 114 may then be used to identify the location of the select cage's communication module 108 within the array 120.

Each other array 122, 124 and 126 has a similar set of radio location transceiver systems that operate in the same manner as the radio location transceivers 114 and 116

Figure 2:
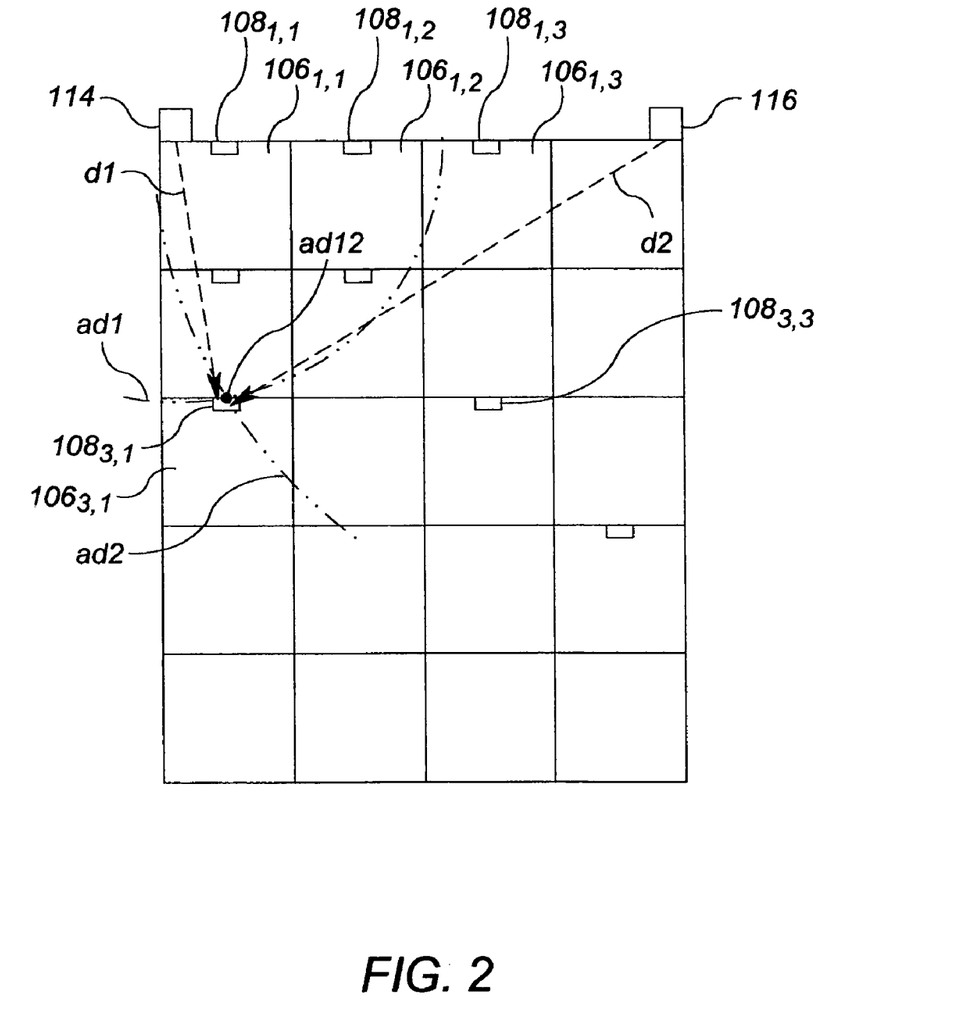
FIG. 2 shows a representative front view of an array of a cage rack of the system of FIG. 1.

An explanation of how distance information from the first and second transceiver systems 114 and 116 is used to identify the location of a cage 106 within the array 120 is provided in connection with FIG. 2. FIG. 2 shows a representative front view of the array 120 of the first rack 102 of FIG. 1. The cages 106 are individually identified by the row and column of the array 120 in which they are located. For example, the cage $106_{1,1}$ is located in the first column and first row of the array 120, the cage $106_{1,2}$ is located in the first column and second row of the array 120, the cage $106_{3,1}$ is located in the third column and first row of the array 120 and so forth. The first location transceiver 114 and the second location transceiver 116 are located proximate a common side of the array 120.

Consider an operation in which the location of the cage $106_{3,1}$ within the array 120 is desired. Assume that the location transceiver 114 determines that the wireless module $108_{3,1}$ of cage $106_{3,1}$ is at a distance d1 away, and the location transceiver 116 determines that the wireless module $108_{3,1}$ is at a distance d2 away. The arc ad1 represents all points in the array 120 that are at a distance of d1 from the first location transceiver 114, and the arc ad2 represents all points in the array 120 that are at a distance of d2 from the second location transceiver 116. The point ad12 represents the unique intersection point of the arcs ad1 and ad2, and thus represents the location of the wireless module $108_{3,1}$ and the cage $106_{3,1}$. Thus, by determining the intersections of the arcs within the array 120 which have the determined distances from each of the first and second location transceivers 114 and 116, the location of a cage $106_{x,y}$ may readily be determined.

Referring again to FIG. 1, at least one element in the system 100 is operable to calculate the array location (i.e. the intersection of the arcs ad1 and ad2) of the select communication module 108 based on the distance information generated by the first and second transceiver systems 114 and 116. This element may be a processing device or circuit within either the first or second transceiver systems 114, 116, the rack data transponder 110, the space wireless hub system 128 (discussed below) or any other element of the system 100.

Referring again to the general description of the cage data system 100 of FIG. 1, the system 100 further includes the space wireless hub 128, a LAN connection 130 and at least one work station 132. The wireless hub 128 is a circuit that is operable to communicate using short-range wireless communications, as well as using the LAN connection 130. In general, the wireless hub 128 operates as an access point to data regarding the various cages 106. To this end, an operator at the work station 132 may request data, including location data and or sensor data, regarding one or more of the cages 106. The work station 132 is operable to communicate the request to the wireless hub 128. The wireless hub 132 is operable to use wireless communications to obtain the requested data via one of the rack data transponders 110 or 112 and/or one or more transceiver systems (such as transceiver systems 114 and 116). Further detail on data acquisition for the system 100 is provided further below.

The wireless hub 128 is further operable to receive requests for cage information (location and/or sensor data) from a wireless personal wireless device (PWD) 134, such as a personal data assistant.

The embodiment of the cage system 100 described herein preferably has at least three basic functions. The first function of the cage system 100 is to log and monitor sensor data associated with each of the cages 106 (and gathered by the corresponding wireless modules). The second function is to automatically determine the location of a specific cage, i.e. the cage 106a, within the cage system 100. The third function of the cage system 100 is to respond to requests for cage sensor data.

In operation, the cage system 100 monitors and logs sensor data of the cages 106 in the following manner. The sensor device(s) of each wireless module 108 sense one or more conditions (i.e. temperature, humidity, $CO_2$ concentration, etc.) on an ongoing basis. Each wireless module 108 from time to time transmits sensed condition data (sensor data) to the wireless hub 128. To this end, the wireless module 108 preferably transmits the sensor data to its corresponding rack transponder. For example, the wireless module 108a, which is located on the first rack 102, transmits sensor data to the first rack transponder 110. The rack transponder (e.g. the rack transponder 110) retransmits the data to the wireless hub 128. The wireless hub 128 then stores the data locally, and/or provides the data to the work station 132. The work station 132 preferably maintains the data and makes the data available on a display screen or the like. The work station 132 may further create a log of historical conditions if desirable.

It will be appreciated that in an alternative embodiment, the wireless modules 108 may communicate directly with the wireless hub 128. However, it is desirable to employ the intermediate rack transponders to reduce the need for long antennae and/or greater transmission power in the wireless modules 108.

In the second operation, the wireless hub 128 may receive a request to obtain location information for one of the wireless modules 108, for example, the wireless module 108a. Such a request may be originated at the PWD 134, which transmits a request for the location of the cage 106a and/or the corresponding wireless module 108a to the wireless hub 128. Alternatively, an operator may originate such a request at the work station 132 (or other entity connected to the LAN 130).

Regardless of the origination, the wireless hub 128 transmits a location request signal to the radio location transceivers of the array that corresponds to the module 108 for which location information is requested. Thus, in the exemplary operation described herein, the wireless hub 128 transmits the location request signal pertaining to the module 108a to the transceivers 114 and 116 of the array 120.

It will be appreciated that the wireless hub 128 must at some point obtain information identifying the array 120 in which the module 108a is located. Such information may be obtained in multiple ways. In a first method, the wireless hub 128 may request that all radio location transceivers of all arrays 120, 122, 124 and 126 attempt to locate the module 108a. Only the radio location transceivers of the appropriate array 120 should be able to give a viable answer because those of the arrays 122, 124 and 126 would not be able to locate the wireless module 108a. Even if the radio location transceiver of another array could pick up a stray signal and thus generate distance information, the location transceivers that generate distance information representative of the least distance can be identified as the appropriate set of radio location transceivers. Alternative, the rack on which a particular wireless module 108 is located may be determined by the rack transponders 110 and 112. To this end, each of the rack transponders 110 and 112 may poll the wireless modules 108 to determine which modules 108 are located in its rack. Once the rack of the module 108a is known, then the location request may be sent to only those sets of location transceivers that are in the appropriate rack for the module.

In any event, the radio location transponders 114 and 116 then transmit a radio location signal to the subject wireless module 108a responsive to the request from the wireless hub 128. In particular, the first radio transceiver 114 transmits a first radio location signal having a parameter unique to the wireless module 108a. The unique parameter may suitably be a unique frequency, phase shift, digital code or a unique combination of elements. The wireless module 108a is configured to respond only to location signals including that unique parameter. In this manner, only one wireless module 108a responds to the radio location signal, even though all of the communication modules 108 in the array 120 would at least nominally receive the signal.

The wireless module 108a then transmits the response to the first radio location transceiver 114. The first radio location transceiver 114 employs one or more techniques to determine a distance value based on the transmission of the radio location signal and the receipt of the responsive signal. One such method involves a radar-type technique which is describe below in connection with FIGS. 4 and 9.

The second radio location transceiver 116 also transmits a location signal with the parameter unique to the wireless module 108a and receives a responsive signal. The second radio location transceiver 116 similarly generates its own distance information.

In accordance with the present embodiment, the first and second location transceivers 114 and 116 transmit the distance information to the wireless hub 128, preferably through the rack transponder 110. The wireless hub 128 uses the two distances to determine the array location, employing the method described above in connection with FIG. 2. The wireless hub 128 then transmits the determined location within the array 120, as well as the rack 102 and array 120 on which the wireless communication device 108a is located, to the requesting device (e.g. the PWD 134 or the work station 132). The work station 132 and/or PWD 134 that receives the location information may then visibly display the information in a manner that is comprehensible to a human viewer. For example, a text message containing a rack, array, row and column number may be provided, or a graphic display of the location may be provided.

The third general feature of the system 100 is to provide sensor data responsive to a request. In one operation, the work station 134 generally maintains sensor data for all the cages 106 as described above. Accordingly, an operator may request current sensor information for any of the cages 106 by formulating a query to the work station 134. To this end, the work station 134 may suitable have a front end and data handling capability similar to that of the INSIGHT™ model workstation, which is typically used as a data server for HVAC and other building systems, and which is available from Siemens Building Technologies, Inc. of Buffalo Grove, Ill.

In some cases it is preferable to obtain current sensor data from the wireless modules 108 themselves instead of obtaining the sensor data maintained by the work station 132. In some embodiments, for example, the work station 132 may not maintain sensor data as it is received, but rather further processes or filters the data. The operation of requesting data from the sensor modules 108 is known as "polling" the wireless modules 108.

In the exemplary embodiment described herein, the wireless hub 128 is operable to receive polling requests via wireless signals from the PWD 134. A polling request preferably includes information identifying the cage and the type of sensor data requested. Alternatively, a polling request may only identify the cage, in which case all of the current sensor data of the identified cage is requested.

Consider an example in which the PWD 134 generates a polling request for sensor data from the cage 106a of FIG. 1. The wireless hub 128 receives the request and formulates a corresponding query signal that is transmitted to the first transponder 110. The first transponder 110, responsive to the query signal, generates a data request signal and transmits the signal to the wireless module 108a. The wireless module 108a, responsive to the data request signal, generates an output based on its current sensor values and transmits the output as wireless signal to the first transponder 110. The first transponder 110 receives the output signal and forwards the output data (or data representative thereof) to the wireless hub 128. The wireless hub 128 then transmits the information to the PWD 134.

It will be appreciated that the work station 134 or other devices, not shown, connected to the LAN 130 may generate similar polling requests that are satisfied through the wireless hub 128 in the same manner.

The above operations provide significant advantages over prior art methods of tracking the location of cages and/or obtaining data regarding certain conditions of the cages in a multiple cage environment. It will be appreciated that some advantages of the invention will be realized in a system in which the sensor data monitoring and/or polling operations are available even if the automatic cage location operation is not incorporated. Similarly, some of the advantages of the invention may be realized in a cage system that only incorporates the cage location operation and not the sensor telemetry operations described above.

It is noted also that by employing individual data transponders 110, 112, on each rack 102, 104, the wireless modules 108 have reduced antenna requirements and/or reduced transmission power requirements. As a consequence, the wireless modules 108 may have a smaller physical size. The smaller sized wireless modules 108 advantageously have less impact on the size requirements of the cages 106. By contrast, if large, high power RF transceiver circuits were employed, the size of the cages 106 may have to be significantly enlarged. Moreover, the heat generated by such high power circuits could adversely affect the animals within the cages 106.

To further reduce power and size requirements, it is preferable if the sensors used on the wireless modules 106 incorporate MEMs technology. Moreover, to reduce power requirements, it is preferable if the wireless modules 108 limit the number of sensor data transmissions. In the embodiment described herein, the sensor modules 108 include filters that actively determine whether enough change has occurred in a particular sensed condition to justify a transmission to the wireless hub 128 (i.e. through its corresponding rack transponder).

Figure 7:
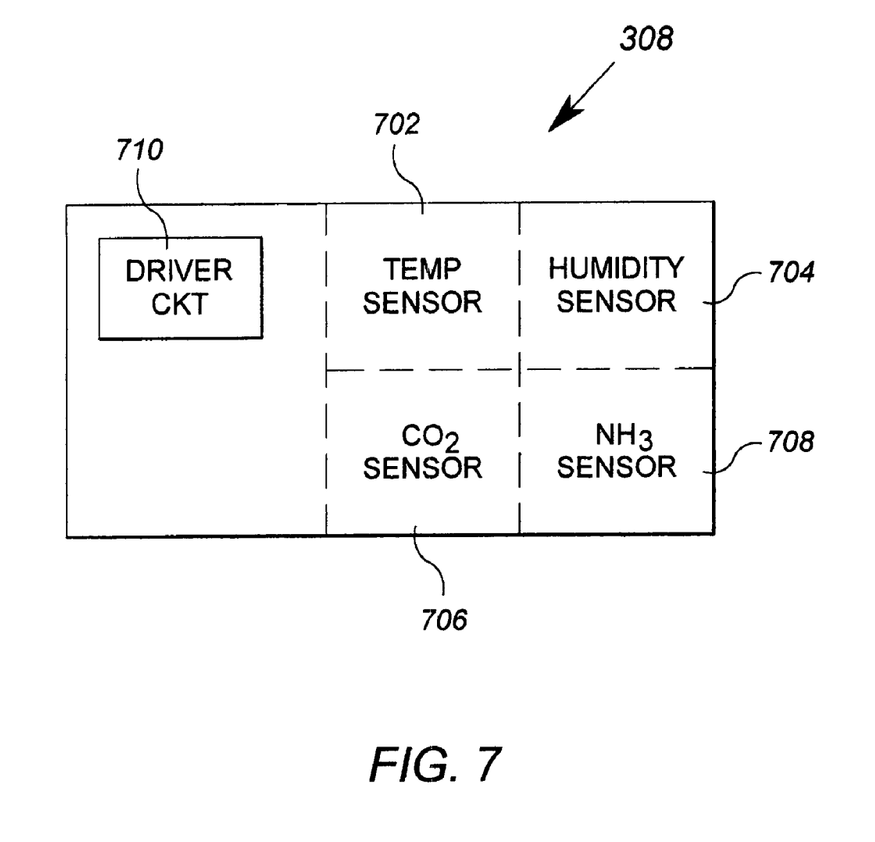
FIG. 7 shows a representative schematic drawing of an exemplary embodiment of the sensor module of the wireless module of FIG. 3.
Figure 8:
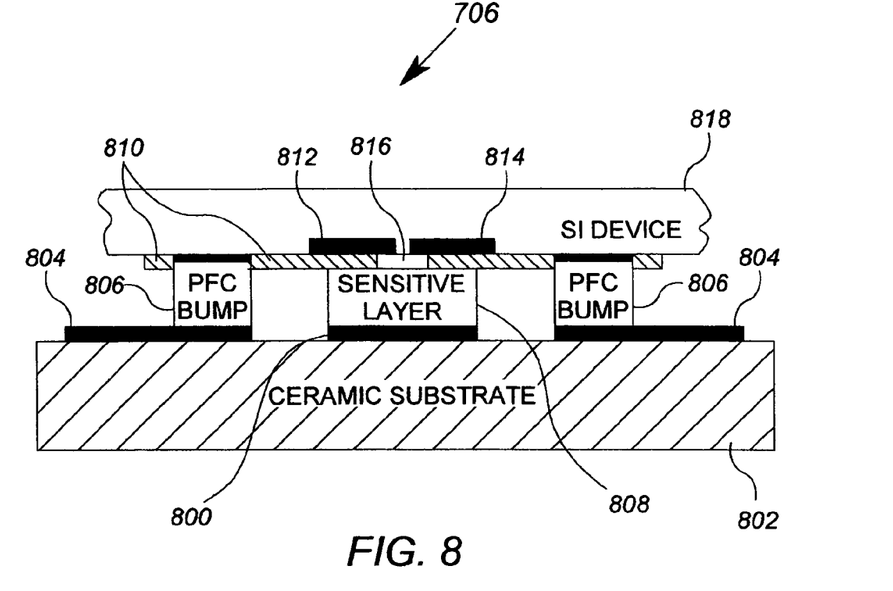
FIG. 8 shows an exemplary MEMS gas sensor that may be used as one of the sensors in the sensor module of FIG. 7.
Figure 9:
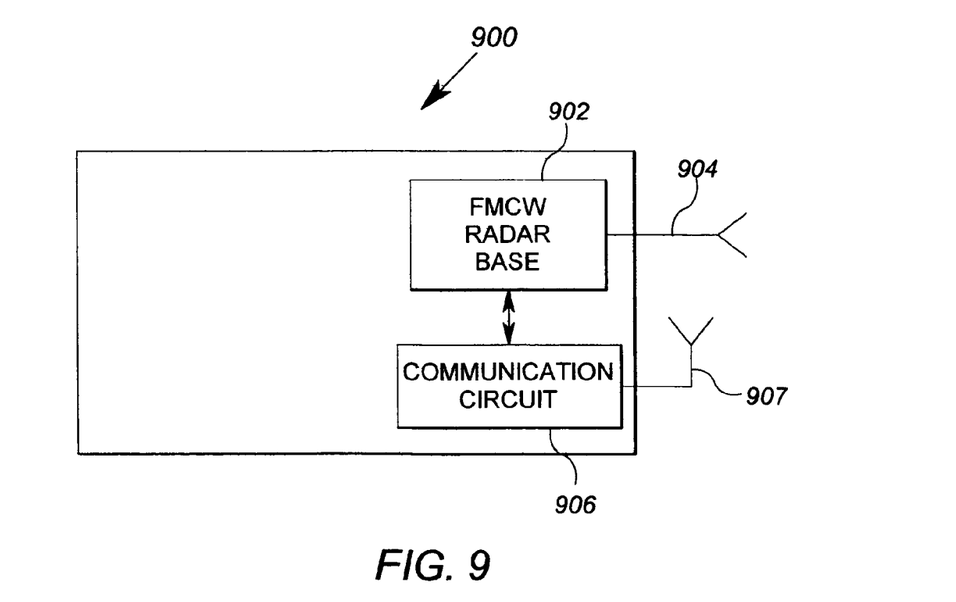
FIG. 9 shows a schematic block diagram of an exemplary radio location transceiver that may be used as the radio location transceivers of the system of FIG. 1.
Figure 10:
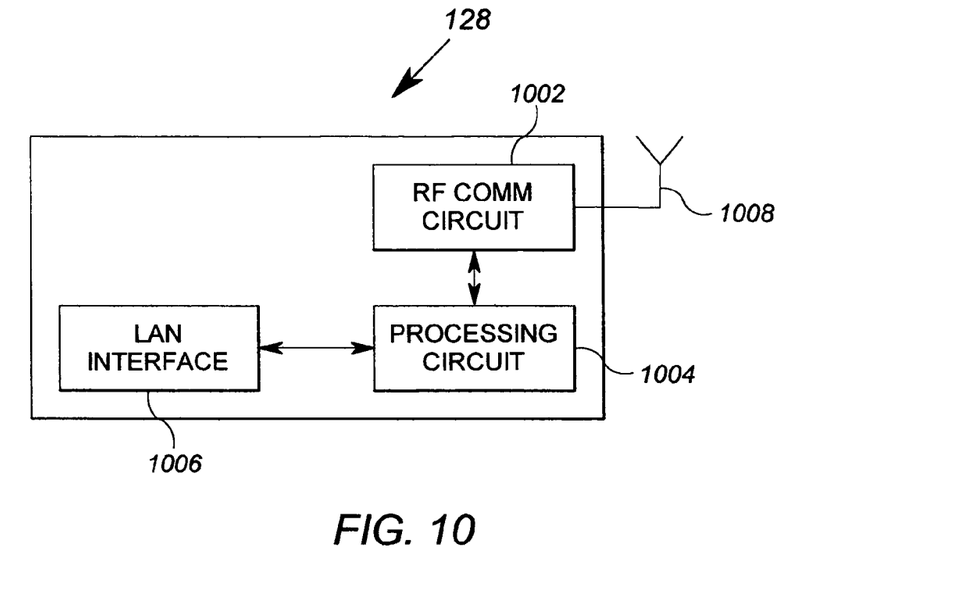
FIG. 10 shows a schematic block diagram of an exemplary wireless hub that may be used as the wireless hub of the system of FIG. 1.
Figure 11:
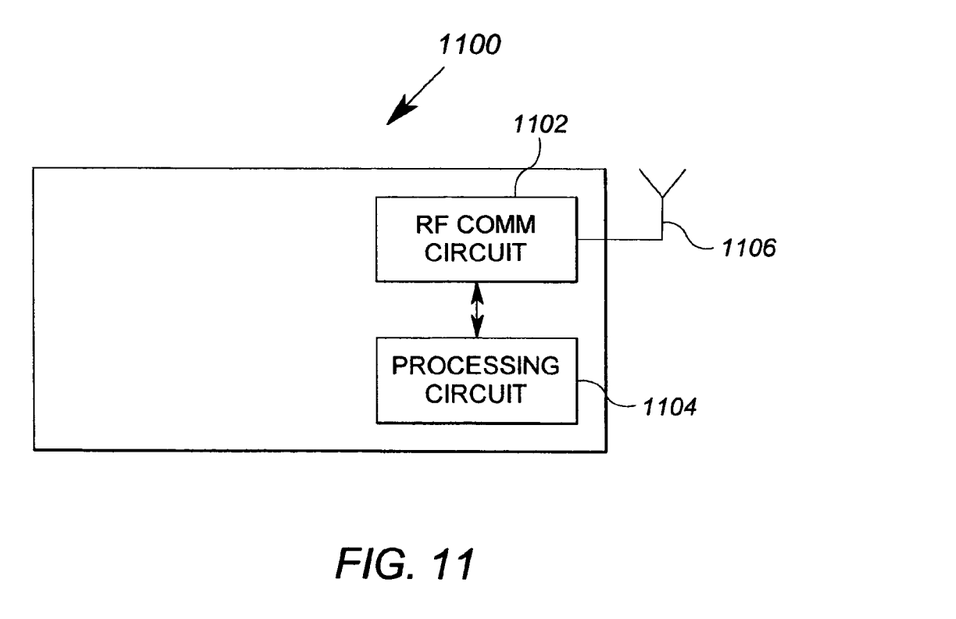
FIG. 11 shows a schematic block diagram of an exemplary rack transponder that may be used as any or all of the rack transponders of the system of FIG. 1.

FIGS. 3-11 show in further detail exemplary embodiments of the elements of the system 100. FIGS. 3-8 show various elements and/or operations of an exemplary embodiment of a wireless module 300 that may be used as one or more of the wireless modules 108 of FIG. 1. FIG. 9 shows an exemplary radio location receiver 900 that may be used as the radio location transceivers 114 and 116 (as well as others) of FIG. 1. FIGS. 10 and 11 show schematic block diagrams of an exemplary wireless hub and transponder 1100, respectively, that may be used as the wireless hub 128 and rack transponders 110 and 112 of FIG. 1, respectively.

Referring to FIG. 3, the wireless module 300 includes an RF circuit 302, a power management module 304, a processing circuit 306, and a MEMS-based sensor module 308. In a preferred embodiment, many or most elements of the RF circuit 302 are also formed using MEMS or MEMS-like technology. The module 300 includes a silicon substrate 301 which supports each of the elements 302, 304, 306 and 308. As will be discussed below, the MEMs elements that require non-silicon substrates may be supported on the silicon substrate 301 using flip chip bonding techniques. It is advantageous to have most or all of the elements 302, 304, 306 and 308 supported on a single silicon substrate because it reduces power requirements and reduces the footprint of the sensor module 300. However, at least some advantages of the invention may be obtained even if only some of the elements are incorporated onto a single substrate, such as the sensor module 308 and processing circuit 306.

It will be appreciated that in the present embodiment, the elements 302, 304, 306 and 308 may all be connected using conductive interconnects 309 that are formed on the semiconductor substrate 301. Such conductive interconnects 309 may suitably be metallic interconnects or traces and/or polysilicon conductors, that are formed on the substrate 301 using known techniques.

In general, the RF circuit 302 is operable to communicate using local wireless communication protocols such as Bluetooth, or other short-range wireless protocols. In the embodiment described herein, the RF circuit 302 is operable to communicate data signals to and from a wireless transponder such as the transponder 110 of FIG. 1, and is further operable to communicate signals with a radio location transceiver such as the transceivers 114 and 116. The RF circuit 302 is operably connected to receive bias power and transmission power from the power management module 304. The RF circuit 302 is further operable to process received RF signals and provide digital signals to the processing circuit 306, and to receive digital signals from the processing circuit 306 and generate transmission RF signals therefrom.

Figure 4:
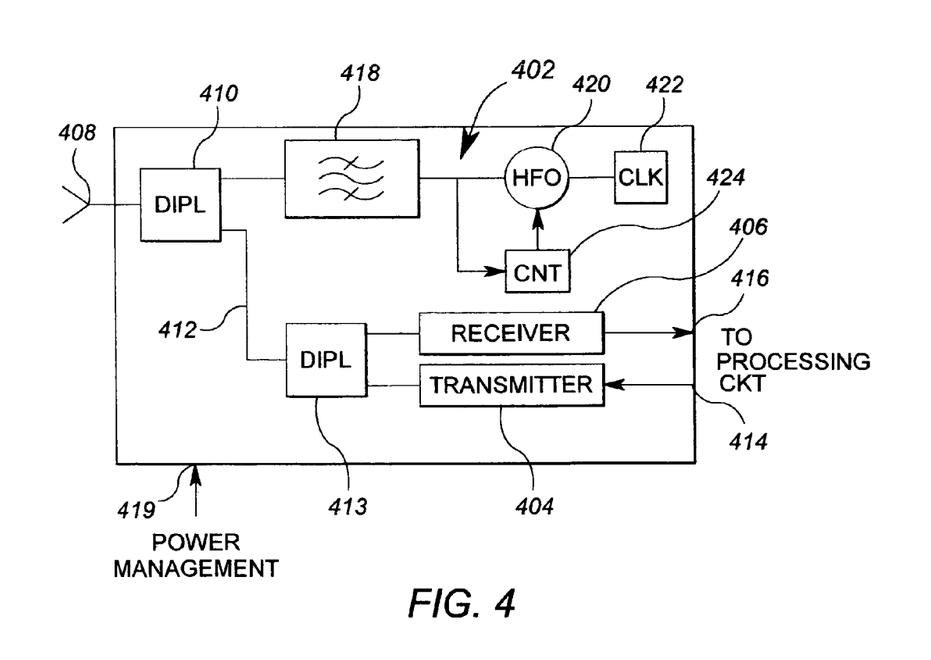
FIG. 4 shows in further detail a schematic block diagram of an exemplary embodiment of the RF circuit of the wireless module of FIG. 3.

FIG. 4 shows in further detail an exemplary block diagram of the RF circuit 302. The RF circuit 302 in the embodiment described herein includes a frequency modulated continuous wave radar transponder system 402 that cooperates with corresponding radio location transceivers (e.g. transceivers 114, 116 of FIG. 1 and transceiver 900 of FIG. 9) to provide location information for the wireless module 300. The RF circuit 302 also includes an RF data transmitter 404 and an RF data receiver 406 operably connected to the processing circuit 306. The RF circuit 302 further includes an antenna 408, which preferably is in the form of an integral electrical trace on the substrate 301, or on the substrate of the RF circuit 302, which may be separate as discussed below.

The antenna 408 is operable to radiate signals generated by the radar transponder system 402 and/or the RF data transmitter 404, and is further operable to receive externally-generated signals and, if appropriate, pass the signals on to the radar transponder system 402 and/or the RF data receiver 406. In the embodiment described herein, the frequency modulated continuous wave radar transponder system 402 employs a different operating frequency than the data transmitter 404 and data receiver 406. Accordingly, the RF circuit 302 also includes a first diplexer 410 coupled between the antenna 408 that passes only those signals in the operating band of the radar transponder system 402 between the antenna 408 and the radar transponder system 402, and passes only those signals in the operating band of either the data transmitter 404 or the data receiver 406 to a data communication line 412. The data communication line 412 further connects to a second diplexer 413 that separates received RF data signals (in a first subband) from transmitted RF data signals (in a second subband). The second diplexer 413 is operably connected to provide the first subband signals from the data communication line 412 to the RF data receiver 406, and provide second subband signals from the RF data transmitter 404 to the communication line 412.

The RF data receiver 406 is a circuit operable to receive Bluetooth, or other types of short range RF signals. In some cases, the data receiver 406 is further operable to convert the signal energy of the incoming RF signal into bias energy that may be used to recharge the batteries, or other energy storage device of the power management circuit 304. In any event, the RF data receiver 406 is preferably operable to frequency-convert and demodulate received RF signals, and to provide the resulting baseband data signals to the processing circuit 306 via receiver output 416. Suitable receivers having the above-described qualities are known in the art.

Similarly, the RF data transmitter 404 is operable to transmit Bluetooth, or other types of short range RF signals. The RF data transmitter 404 is operable to modulate data signals received from the processing circuit 306 via transmitter input 414. The RF data transmitter 404 is further operable to frequency-convert the modulated data signals to the appropriate channel transmission frequency, if conversion is necessary. Suitable transmitters having the above-described qualities are known in the art. The RF data transmitter 404 is operable to provide the frequency-converted data signals to the antenna 408 via the diplexers 410, 413 and the communication line 412.

The frequency modulated continuous wave (FMCW) radar transponder system 402 includes a bandpass filter 418, a high frequency oscillator 420, a clock circuit 422, and a control circuit 424. In general, the clock circuit 422 drives the oscillator 420 to be switched on an off at a signature or unique frequency for the wireless module 300. Thus, each wireless module 108 of the system 100 of FIG. 1 preferably has a unique parameter in the form of a frequency value. The frequency value specific to the wireless module 300 corresponds to the clock signal frequency of the signal generated by the clock circuit 422 of the wireless module 300.

The oscillator 420 is configured to be excitable by a received signal that is quasi-phase coherent with the clocking signal. Thus, only received signals that are coherent to the clock signal frequency of the clock circuit 422 will excite the oscillator 420. The bandpass filter 418 is configured to reduce the noise due to modulation by-products of the switching clocking signal. The control circuit 424 is a feedback control circuit that regulates the oscillator 420 to its signature frequency. The above described FMCW radar transponder system 402 circuit is designed to work with compatible base station, which in the embodiment described herein, is the radio location transceiver 900 of FIG. 9. Further detail regarding a suitable embodiment of the FMCW radar transponder system 402 is provided in International Patent Application PCT/DE02/04098, filed Nov. 5, 2002, which is incorporated herein by reference. A translation of this document is filed herewith. That document describes how the FMCW radar transponder system 402 may be realized in a hybrid flip chip assembly, which is preferable for the embodiment of the communication module 300 described herein. It is preferable that the RF circuit 302 in general be formed and then attached to the silicon substrate 301 using flip chip bonding technology. Examples of such procedures are discussed in connection with FIG. 9 of PCT/DE02/04098.

It will be appreciated that the RF circuit 302 of FIG. 4 further includes a power input 419 from the power management circuit 304. The power management circuit 304 provides the bias power for the various elements of the RF circuit 302 through the power input 419.

Referring again to FIG. 3, the power management circuit 304 in the embodiment described herein includes a lithium ion rechargeable battery, and may include a trickle charger. The trickle charger may suitably be coupled to the RF circuit 302 such that the trickle charger can harvest energy from received RF signals. Circuits capable of providing these functions are known in the art. Regardless, the battery preferably formed on the substrate 301, or at least connected thereto via flip chip techniques. Lithium ion batteries are particularly advantageous because they have a charge life that can be coextensive with cage cleaning cycles (i.e. several weeks).

The processing circuit 306 is operable to generally obtain data from the sensor module 308, filter it, and prepare the data for transmission. The processing circuit 306 is further operable to process data or information received from the RF data receiver 404 of the RF circuit 302.

Figure 5:
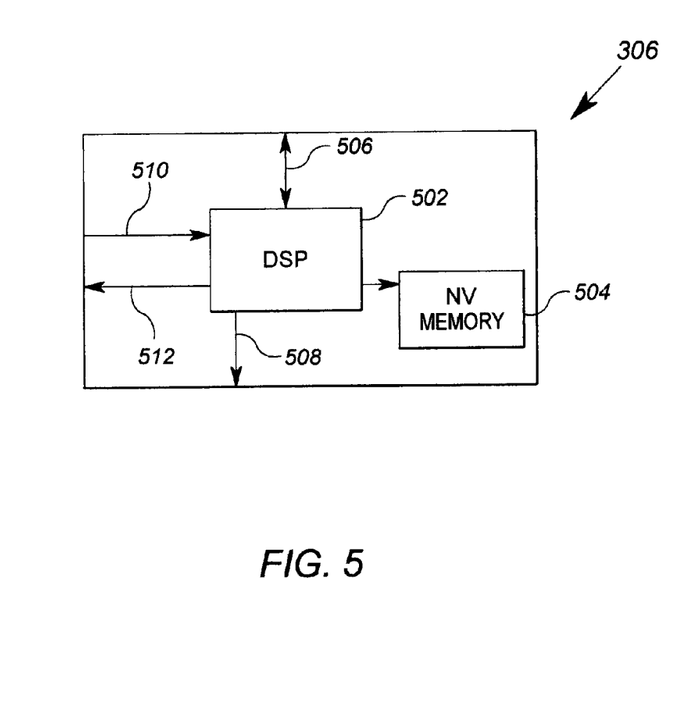
FIG. 5 shows a block diagram of an exemplary embodiment of the processing circuit of the wireless module of FIG. 3.

FIG. 5 shows a block diagram of an exemplary embodiment of the processing circuit 306. The processing circuit 306 includes a digital signal processor (DSP) 502 and a memory 504. The memory 504 is preferably non-volatile such that bias power is not required to retain its contents, thereby conserving power. The memory 504 may therefore include an EEPROM device. Alternatively (or in addition), the memory 504 may include a ferro-electric RAM, which have advantageous features of both non-volatile memories and random access memories. The memory 504 may suitably store some or all of the program instructions for the DSP 502 and/or operating parameters of the DSP 502, such as filter constants and update periods.

The digital signal processor 502 includes a data input 506 which is operably connected to receive digital sensor data from the sensor module 308, a power input 508 which is operably connected to the battery of the power management circuit 304, a communication input 510 and a communication output 512. The communication input 510 is operably connected to the RF data receiver 406 (via receiver output 416) of the RF circuit 302, and the communication output 512 is operably connected to the RF data transmitter 404 (via transmitter input 414) of the RF circuit 302.

The DSP 502 is operable to obtain measurement values from sensor module 308 via the data input 508 and then perform a filtering operation on the measurement values. The DSP 502 is further operable to determine whether to cause the RF circuit 302 to transmit a signal to an external device based at least in part on the filtering operation. The filtering operation in a first embodiment includes performing an averaging function of each type of measurement value to filter out any spurious noise or aberrational momentary measurements obtained in the sensor module 308. The averaging function may be a weighted running average, a simple running average, or the like.

It will be appreciated that if the sensor module 308 is configured to measure multiple different conditions, such as temperature, humidity and the like, then the DSP 502 performs the filtering operation for measurement values of each condition separately. Thus, the DSP 502 filters temperature measurement values, filters humidity measurement values, and so forth.

In order to determine whether to transmit any of the filtered measurement values, the DSP 502 determines whether a filtered measurement value differs by more than a predetermined threshold from the previously transmitted value. In other words, if the current filtered value does not differ significantly from the last value transmitted, then the DSP 502 does not transmit the new data, thereby decreasing the number of transmissions to conserve power.

Figure 6:
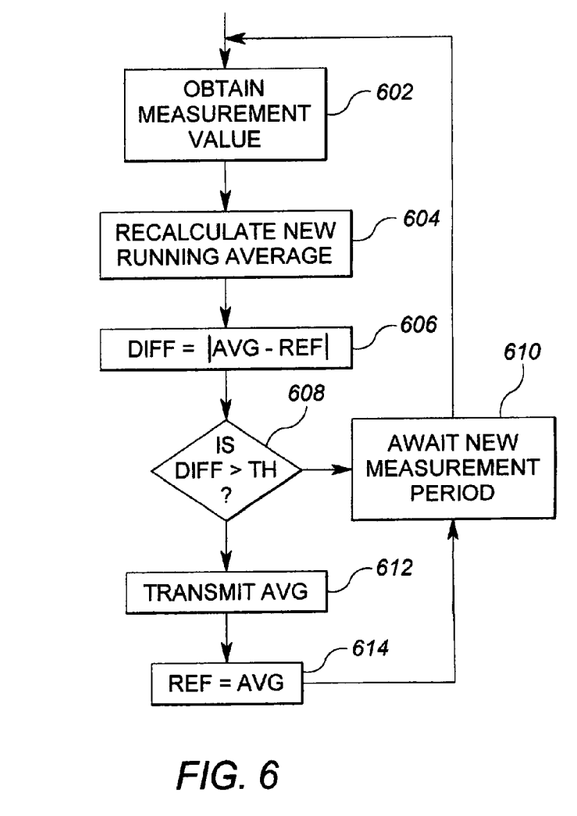
FIG. 6 shows a flow chart of an exemplary set of operations that are carried out by the processing circuit of FIG. 5.

FIG. 6 shows an exemplary flow chart of the operations of the DSP 502 to carry out the above described operations. The operations of FIG. 6 are carried out separately for each condition (i.e. temperature, humidity, $CO_2$ levels, etc.) that are monitored. In step 602, the DSP 502 obtains a new measurement value at its data input 506. In step 604, the DSP 502 filters the value by calculating a new running average. To this end, the DSP 502 and/or the memory 504 preferably stores the last N raw measurement values, and then the DSP 502 replaces the oldest raw measurement value with the new measurement value that was obtained in step 602. Then, a new average (weighted or simple) is calculated.

In step 606, the resulting filtered measurement value AVE is compared to a reference value REF. Typically, the value REF is the most recent filtered measurement value that was transmitted to the external data server (e.g. work station 132) via the RF circuit 302. In any event, the result different DIFF is equal to the absolute value of the difference between REF and AVE.

In step 608, the DSP 502 determines if DIFF exceeds a predetermined hysteresis threshold TH. If not, then the DSP 502 proceeds to step 610 and no value is caused to be transmitted externally. If so, however, then the DSP 502 proceeds to step 612 and causes the value AVE to be transmitted via the RF circuit 302. To this end, the DSP 502 provides a data signal that includes information representative of the value AVE to the communication output 512.

It will be appreciated that it may be advantageous to transmit all other measurement values in step 612. In particular, as long as one measurement value must be transmitted because of a notable change, there is relatively little power cost in transmitting the other measurement values as well. Thus, even if the other measurement values have not changed significantly, they may be transmitted if at least one has changed significantly. For example, if the temperature measurement value AVE differs from the reference temperature value REF by more than the threshold TH, it may be advantageous to transmit the other filtered values (e.g. humidity and/or gas levels) even if those other filtered values do not differ from their reference values.

In any event, in step 612, the DSP 502 causes at least the measurement value AVE to be transmitted externally, for example, to the wireless hub 128 via the rack transponder. In this manner, the work station 132 is kept up to date with the most current sensor values of each cage 106, with reduced power strain on the individual communication modules 108.

Referring again to FIG. 6 specifically, after step 612, the DSP 502 performs step 614. In step 614, the DSP 502 replaces the reference value REF with the value AVE that was transmitted out in step 612. The DSP 502 thereafter proceeds to step 610.

In step 610, which is executed after either step 608 or step 614 as described above, the DSP 502 awaits a new measurement value. The measurement period (time between measurements) may vary based on user preference. However, the measurement period should balance the need for relatively frequent updates for animal safety, particularly in light of the filter tap number N, with the need for limiting power consumption.

In addition to the above functions of FIG. 6, the DSP 502 may also compare the filtered measurement value AVE with an absolute alarm level. For example, alarm thresholds may be set for individual conditions that relate to animal safety and other factors. Thus, for certain unhealthy temperature levels, gas levels, or even humidity levels, the DSP 502 may have corresponding alarm thresholds. The DSP 502 is preferably operable to at least transmit an alarm signal and/or the measured value itself in the event that a filtered measurement value is outside one of its corresponding alarm thresholds.

Referring generally to FIG. 5, the DSP 502 and memory 504 may readily be formed integrally in the semiconductor substrate using well known methods.

FIG. 7 shows a representative schematic drawing of the sensor module 308. The sensor module 308 in the embodiment described herein includes a MEMs temperature sensor 702, a MEMs humidity sensor 704, a MEMs $CO_2$ sensor 706, and a MEMs $NH_3$ sensor 708. The sensor module 308 also includes a driver circuit 710 that converts the various MEMS detected measurements into values that may be understood by the DSP 502.

MEMS sensors capability of measurement temperature, humidity, $CO_2$, and $NH_3$ are known in the art. Such sensors are typically formed having a ceramic base and an active MEMs structure, and often include semiconductor components that generate values based on the mechanical or other property of the active MEMS structure. In accordance with the present invention, the semiconductor components or regions of the MEMS sensors 702, 704, 706 and 708 are formed in the silicon substrate 301, and the ceramic base and active MEMS structures are attached to the silicon substrate 301 using flip chip bonding technology.

For example, FIG. 8 shows an exemplary MEMS gas sensor 800 that may be used as the $CO_2$ sensor 706 or the $NH_3$ sensor. The device includes a ceramic substrate 802, metallization layers 804, polymer flip chip bonds 806, a gas sensitive later 808, a passivation layer 810, a FET source region 812, a FET drain region 814, an air gap 816 and a silicon substrate 818. The gas sensitive layer 808, the air gap 816, the FET source region 812 and the FET drain region 814 form a suspended gate FET, in which the gate voltage varies dependent in part upon the presence of gas detected by the gas sensitive layer 808. A bias voltage is applied to the metallization layer 804 under the gas sensitive layer 808 which causes a first drain 814 to source 816 output level. The gas sensitive layer 808 behaves in such a way as to reduce or increase the gate voltage depending on the concentration of the subject gas that is present.

It can be readily appreciated that the drain region 814 and source region 812 may be implanted or otherwise formed in the semiconductor substrate 301 of the wireless module 300. The sensitive layer 808 and metallization layers 804, which are supported on the ceramic substrate 802, are placed in position and then ceramic substrate 802 is mounted on the silicon substrate 301 using polymer flip chip bonds 806. It will be appreciated that both gas sensors 706 and 708, as well as the temperature sensor 702 and humidity sensor 704, may be formed on the same ceramic substrate 802 which is then flip chip bonded to the substrate 301 of the wireless module 300.

Another suitable construction of multiple MEMS sensors on a single silicon substrate is shown and described in U.S. Pat. No. 6,471,853 to Moscaritolo, issued Oct. 29, 2002, which is incorporated herein by reference.

Figure 12:
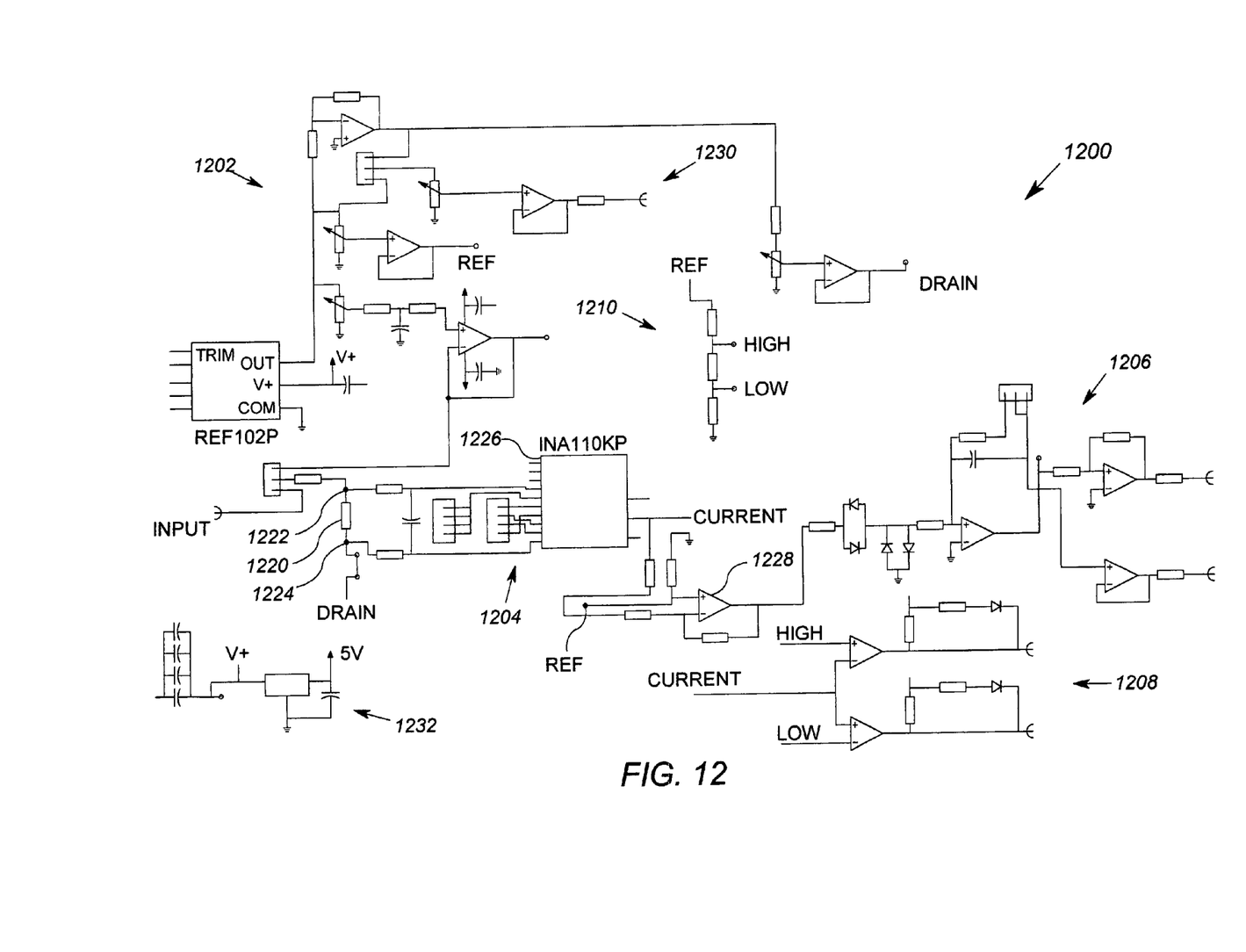
FIG. 12 shows a schematic diagram of an exemplary embodiment of a portion of a driver circuit of the sensor module of FIG. 7.

The use of MEMS sensors 702, 704, 706, and 708 greatly reduces the size and power consumption of the overall sensor module 308 as compared to a sensor module that uses conventional sensor devices. The operation of the wireless module 300 is describe with general reference to FIGS. 3 through 8. An exemplary embodiment of a portion of the driver circuit 710 is shown in FIG. 12 and discussed further below.

Under normal circumstances, each of the MEMS sensors 702, 704, 706 and 708 will provide measurement values to the DSP 502 via the driver circuit 710 in an ongoing basis. As described above, the DSP 502 filters each sensor value to derive a filtered temperature measurement value, a filtered humidity measurement value, a filtered $CO_2$ measurement value, and a filtered $NH_3$ measurement value. (See step 604 of FIG. 6). If any of the filtered measurement values differ from their corresponding reference value by more than a predetermined amount, then the DSP 502 causes that differing measurement value, and preferably all of the measurement values, to be transmitted to the transponder of the rack on which the wireless module 300 is located. (See steps 608 and 612 of FIG. 6, discussed further above).

To transmit the signal, the DSP 502 causes a data signal to be generated that includes information representative of the one or more filtered measurement values. The DSP 502 provides the generated data signal to the data transmitter 404 of the RF circuit 302 via the communication output 510. The data transmitter 404 modulates the data signal onto a first RF signal, and then converts the frequency of the first RF signal to a suitable communication channel frequency. The converted RF signal propagates through diplexer 413, which is configured to pass signals having the signal band of the converted RF signal between the RF data transmitter 404 and the communication line 412. The converter RF signal further propagates through the diplexer 413, which is configured to pass signals having the signal band of the converted RF signal between the communication line 412 and the antenna 408. The signal radiates from the antenna 408 to a corresponding receiver in the rack transponder (e.g. rack transponder 110 or 112). The rack transponder relays the signal to the room hub 128.

Referring to FIG. 1, because there are several wireless modules 108 on each rack that can communicate with the rack transponder, provision must be made for avoiding loss of data resulting from multiple communication modules 108 attempting to communicate with the transponder at the same time. One method of decreasing the possibility of lost data is to have each wireless module 108, and particularly the DSP 502 of the wireless module 300, await receipt of an acknowledgement from the rack transponder whenever data is transmitted. If the wireless module 300 does not receive the acknowledgement after a predetermined amount of time after a transmission, then the DSP 502 can cause the sensor data signal to be retransmitted.

As discussed further above, sensor data may also be pulled from the sensor data. In other words, another device within the telemetry system 100 may generate a polling request for the wireless module 300. As also discussed above, the wireless module 300 receives the polling requests through the rack transponder (e.g. rack transponder 110 or 112). The received polling request is in the form of an RF signal modulated with digital data representative of the request. The antenna 408 receives the signal, which has a signal band configured to pass through the diplexers 410 and 413 to the receiver 406. The receiver 406 demodulates or otherwise obtains a data signal representative of the request from the RF signal and provides the data signal to the DSP 502 through the communication input 510. The DSP 502 processes the request, and provides one or more of the current filtered measurement values (value AVE calculated in step 604 of FIG. 6 for each sensor measurement value) as a responsive data signal. The responsive data signal is provided to the data transmitter 404 and transmitted via the antenna 408 as described above.

It is noted that the wireless module 300 may receive other control signals in the same manner as the polling request described above. Such other control signals may include filter parameter adjustments, alarm threshold changes, or hysteresis threshold adjustments, among other things. Filter parameters may include the number of samples used in averaging, known as the filter tap number. Other parameters may include the weighting of the taps, or other parameters of other types of filters.

Operation of the wireless module 300 in the location operation described above in connection with FIGS. 1 and 2 is advantageously described in connection with a more detailed drawing of a radio location transceiver. FIG. 9 shows an exemplary radio location transceiver 900 that may be used as the radio location transceivers 114 and 116 of FIG. 1. The radio location transceiver 900 includes an FMCW radar base station circuit 902, a directional antenna 904, and a communication circuit 906.

The FMCW radar base station circuit 902 is a device configured to transmit and receive FMCW radar signals and generate distance information based on the transmitted and received signals. Such devices are known, and a suitable one for use with the FMCW radar circuit 402 of the wireless module 108 is shown and described in PCT/DE02/04098.

The directional antenna 904 is arranged such that it radiates RF signals and receives RF signals only from a limited "field of vision", name, along its corresponding array of cages 106.

The communication circuit 906 is a circuit that is operable to communicate with the wireless hub 128 either directly or via a rack transponder such as the rack transponders 110 or 112 of FIG. 1. To this end, the communication circuit 906 is operable to communicate short range wireless signals such as Bluetooth signals or the like. In such a case, the communication circuit 906 may suitably include its own antenna 907. Alternatively, the communication circuit 906 may have a communication cable that is connected to the rack transponder.

As discussed above, two radio location transceivers which may each have the structure of the transceiver 900 are allocated to each array of cage 106. Thus, referring to FIG. 1, each of the arrays 120, 122, 124 and 126 includes a pair of radio location transceivers. As also discussed above, each of the pair of radio transceivers obtains distance information in order to allow a processing device to determine the two dimensional position of a wireless module 108 within its array. Discussed below is the process by which each radio location transceiver obtains the distance information.

Referring again to FIG. 9, each radio location transceiver operates in the following manner to generate the distance information. The FMCW radar base station circuit 902 first generates an RF signal having a frequency that corresponds uniquely to the wireless module 108 being located. The directional antenna 904 propagates the RF signal in the direction of the array of wireless modules in which the wireless module 108 of interest is located.

Referring to FIG. 3, if a wireless module 300 receives an FMCW radar signal that is not intended for that module, the signal will nevertheless be received by the antenna 408 of that module. However, the high frequency oscillator 420 will not be excited to generate a significant response. The high frequency oscillator 420 does not respond because there is not coherence between the frequency of the clock 422 that is switching the oscillator 420 and the incoming signal.

If, however, a wireless module 300 receives an FMCW radar signal that is intended for that module, the signal will be received by the antenna 408 and will cause excitation of the oscillator 420 because of the coherence between the received signal and the switching frequency of the clock circuit 422. The excitation of the oscillator 420 results in the transmission of a responsive location RF signal via the antenna 408.

Referring again to FIG. 9, the directional antenna 904 detects any responsive location RF signal, such as that generated by the wireless module 300 as described above. The received signal is propagated to the FMCW radar base station circuit 902. The FMCW radar base station circuit 902 determines the distance based on characteristics of the transmitted and received signals as is known in the art. The FMCW radar base station 902 provides the distance information to the RF communication circuit 906. The communication circuit 906 then causes the distance information to be transmitted to the wireless hub 128.

FIG. 10 shows a block schematic diagram of an exemplary embodiment of the wireless hub 128. The wireless hub 128 includes an RF communication circuit 1002, a processing circuit 1004, a LAN interface 1006 and an antenna 1008. The RF communication circuit 1002 is generally operable to use short range RF protocols to communicate with the plurality of rack transponders 110, 112, and PWDs such as the PWD 134. In one embodiment, the RF communication circuit is further operable to communicate with the wireless radio location transceivers such as the transceivers 114 and 116. By way of example, the RF communication circuit 1002 may include a Bluetooth transmitter and receiver as is known in the art. The RF communication circuit 1002 transmits and receives RF signals through the antenna 1008.

The wireless hub 128 may use any of a variety of methods to communicate with the multiple transponders 110 and 112 of the system 100 while avoiding interfering transmissions. In some environments, as many as ten or twenty racks (and corresponding transponders) may be present. In such a case, the RF communication circuit 1002 of the wireless hub 128 must employ some method of avoiding loss of data due to multiple simultaneous transmissions. This may be accomplished in many ways. For example, the RF communication circuit 1002, under the control of the processing circuit 1004, may execute a schedule in which it systematically and sequentially polls each transponder (e.g. transponders 110 and 112) for any messages generated by the wireless modules 108 and/or radio location transceivers (e.g. transceivers 114 and 116). Time slots in the schedule may also be allocated for transmitting data to the transponders and for receiving requests from PWD devices such as the PWD device 134. Alternatively, the wireless hub 134 may contain a separate RF communication circuit for communicating with PWD devices.

The processing circuit 1004 generally controls the operation of the RF communication circuit 1002, and further processes sensor data and location data received from the RF communication circuit 1002. The processing circuit 1004 further generates messages necessary to carry out polling requests, location requests, and parameter changes for the wireless modules 108. Such messages are provided to the RF communication circuit 1002 for transmission to the appropriate rack transponder.

The LAN interface 1006 may suitably include a standard Ethernet card or other interface circuit that enables communication with other devices connected to a LAN. Thus, the LAN interface 1006 receives messages from other devices (e.g. work station 132) and provides the messages to the processing circuit 1004. Such messages may include, for example, polling requests, module/cage location requests, and requests to change parameters on one or more of the wireless modules 108. The LAN interface 1006 further conveys data messages that are generated by the processing circuit 1004 to other devices on the LAN, such as the work station 132. Such data messages may include sensor data and location data that is obtained in the manner described above.

It will be appreciated that the LAN interface 1006 may include a wired LAN connection such as an Ethernet card or the like, or may include a circuit operable to communicated on a wireless LAN. Alternative embodiments may employ an interface to other types of computer networks to enable communication with other computers using network protocols.

FIG. 11 shows a block schematic diagram of an exemplary embodiment of a rack transponder 1100 which may be used as the rack transponder 110 or 112 of FIG. 1. The transponder 1100 includes an RF communication circuit 1102, a processing circuit 1104, and an antenna 1106. The RF communication circuit 1102 is a circuit that is operable to communicate with the RF communication circuit 1002 of the wireless hub 128, and that is further operable to communicate with the RF data transmitter and receiver (e.g. transmitter 404 and receiver 406) of the wireless modules 108. In the embodiment described here, the RF communication circuit 1102 is further operable to communicate with the communication circuit 906 of the radio location transceivers (e.g. transceivers 114, 116 of FIG. 1 or transceiver 900 of FIG. 9) associated with each array of the rack on which the transponder is located.

The processing circuit 1104 is operable to store message received from either the wireless hub 128 or wireless modules, and coordinate retransmission of such messages as necessary. The processing circuit 1104 is further operable to receive distance information from the radio location transceivers and forward the information to the wireless hub 128.

FIG. 12 shows a sensor driver module 1200 that may be used as a portion of the driver circuit 710 of the sensor module 308. In general, the sensor driver module 1200 is the portion of the driver circuit 710 that is coupled between a gas sensor, such as the $CO_2$ sensor 706 of FIGS. 7 and 8. Similar driver modules may be used for the other sensors of the sensor driver module 1200.

The sensor driver module 1200 is shown in schematic form of discrete elements, including integrate circuits and jumpers. However, those of ordinary skill in art may readily form integrated circuits directly into a semiconductor substrate such as the substrate 301, and provide electronic switches and connectors in a semiconductor substrate instead of jumpers. The sensor driver module 1200 is further arranged to multiple operational modes. In one mode, the sensor driver module 1200 measures the variation in the source-drain current of the suspended gate FET of FIG. 8, which provides a measure of the presence of gas in the air gap 816. The sensor driver module 1200 is configured for such operation as shown in FIG. 12 and described below. In another mode, the sensor driver module 1200 varies the gate voltage in an attempt to maintain a constant source-drain current. The regulation signal represents a measure of the presence of gas in the air gap 816.

It will be appreciated that those of ordinary skill in the art may readily devise their own sensor driver modules capable of carrying out such either or both of such operations either independently or based on the schematic diagram of the module 1200 of FIG. 12.

Referring to FIG. 12, the sensor driver module 1200 includes an input INPUT which is connected to receive source-drain current of the sensor, or in other words, the current flowing from the drain 814 to the source 812 (see FIG. 8). The INPUT is coupled across a shunt 1220 to generate a differential voltage across points 1222 and 1224. The differential voltage is operably coupled to an instrumentation amplification circuit 1226 (represented here as an integrated circuit). The instrumentation amplification circuit 1226 generates an output signal CURRENT, which is representative of the source-drain current. The output CURRENT is then provided to either or both of two output circuits 1206 and 1208.

The output circuit 1208 compares the value current to two output threshold values, HIGH and LOW, to determine whether the value CURRENT is above both threshold values, between the two threshold values, or below the two threshold values. The output circuit 1208 thus generates a two bit output that is representative of three different levels of the value CURRENT. Such an output circuit 1208 could be used as a direct digital input to the processing circuit.

The output circuit 1206 provides a filtered DC level output which also measures the variation in the value CURRENT.

The sensor driver module 1200 contains a reference generation circuit 1202. The reference generation circuit 1202 provides, among other things, a reference voltage REF that is used by each of the output circuits 1206 and 1208 for comparison against the value CURRENT. In the output circuit 1206, the value CURRENT is compared to the value REF by a first differential amplifier 1228. For the output circuit 1208, the thresholds HIGH and LOW are derived from the value REF by a resistive divider 1210.

The reference generation circuit 1202 also includes the elements necessary to operate in the other mode in which the gate-voltage is regulated. In such a case, the output 1230 of the reference generation circuit 1202 provides the regulation voltage that is indicative of gas presence.

As discussed above, those of ordinary skill in the art may readily devise their own driver circuits having generally the features of converting suspended gate FET operational parameters into readable DC voltage levels or binary values. The circuit of FIG. 12 is provided merely as an exemplary guide of some of the elements that such a driver circuit may employ. Moreover, other suitable driver circuits would be known to those of ordinary skill in the art.

It will be appreciated that the above described embodiments are merely illustrative, and that those of ordinary skill in the art may readily devise their own adaptations and implementations that incorporate one or more of the inventive aspects described herein and fall within the spirit and scope thereof. It will further be appreciate that while the cage modules 108 and 300 are described in connection with animal cages, such devices used in accordance with one or more of the inventive aspects described herein may be used in other environments.

It will further be appreciated that although the term "wireless" is used to describe the wireless module 108 and 300, suitable modules incorporating at least some of the advantages of the present invention may still include some wiring. The term wireless as used herein means having the capability to perform at least some communication using so-called wireless techniques, in other words, radio communications. The term wireless is not intended to describe a condition of having a complete absence of wires.

We claim:

1. A remote sensor assembly for monitoring an animal cage comprising:
   a silicon substrate;
   a plurality of microelectromechanical system (MEMS) sensors supported on the silicon substrate;
   a wireless communication circuit supported on the silicon substrate;
   a processing device supported on the silicon substrate, the processing device operable to obtain measurement values from at least one of plurality of MEMS sensors, perform a first filtering operation on the measurement values, and determine whether to cause the communication circuit to transmit a signal to an external device based on the first filtering operation, wherein the first filtering operation includes determining whether a sensor-derived value differs from a stored reference value by more than a threshold amount, and a plurality of conduction paths formed in the silicon substrate, wherein at least a part of a plurality of MEMS sensors are disposed on a separate substrate that is supported on a surface of the silicon substrate and connected to the processing circuit at least in part through the conductive paths.

2. The remote sensor assembly of claim 1, wherein the processing device is integrally formed with the silicon substrate.

3. The remote sensor assembly of claim 1, further comprising a plurality of conduction paths formed in the silicon substrate, wherein at least a part of a plurality of MEMS sensors are disposed on a separate substrate that is supported on a surface of the silicon substrate and connected to the processing circuit at least in part through the conductive paths.

4. The remote sensor assembly of claim 1, wherein the MEMS sensors include integrated temperature, carbon dioxide, ammonia and humidity sensors.

5. The remote sensor assembly of claim 1 wherein the reference value is based on a previous sensor-derived value.

6. The remote sensor assembly of claim 1 wherein the reference value corresponds to an alarm threshold value.

7. The remote sensor assembly of claim 1 wherein the plurality of MEMS sensors are integrated into a MEMS sensor module that is disposed on the substrate, and wherein the sensor-derived value is a value received from the MEMS sensor module.

8. A method of obtaining sensor data from an animal cage, comprising:
   a) obtaining data regarding at least one environmental factor using a sensor assembly that is disposed proximal to the animal cage, the sensor assembly including a silicon substrate, a plurality of microelectromechanical system (MEMS) sensors supported on the silicon substrate, a wireless communication circuit supported on the silicon substrate, and a processing device supported on the silicon substrate;
   b) performing digitally a first filtering operation on measurement values received from at least one of plurality of MEMS sensors, the first filtering operation including a low pass filtering operation, and
   c) determining whether to cause the communication circuit to transmit a signal to an external device based on the first filtering operation.

9. The method of claim 8, wherein the processing device is integrally formed with the silicon substrate.

10. The method of claim 8, wherein the silicon substrate includes a plurality of conduction paths formed therein, and wherein the plurality of MEMS sensors comprise a separate module that is disposed on a surface of the silicon substrate and which is coupled to the plurality of conduction paths.

11. The method of claim 8, wherein the plurality of MEMs sensors includes at least two of the group consisting of temperature, carbon dioxide, ammonia and humidity sensors.

12. The method of claim 8, wherein the first filtering operation includes determining whether a sensor-derived value differs from a stored reference value by more than a threshold amount.

13. The method of claim 12, wherein the reference value is based on a previous sensor-derived value.

14. The method of claim 12, wherein the reference value corresponds to an alarm threshold value.

15. The method of claim 12, wherein the plurality of MEMS sensors are integrated into a MEMS sensor module that is disposed on the silicon substrate, and wherein the sensor-derived value is a value received from the MEMS sensor module.

16. The remote sensor assembly of claim 1, wherein the sensor-derived value comprises an average of a plurality of sensor values.

17. The remote sensor assembly of claim 16, wherein the first filtering operation further comprises determining whether an absolute value of a difference between the average of the plurality of sensor values and the stored reference value exceeds the threshold amount.

18. The remote sensor assembly of claim 1, wherein the first filtering operation further comprises determining whether an absolute value of a difference between the sensor-derived value and the stored reference value exceeds the threshold amount.

19. The remote sensor assembly of claim 18, wherein the processing circuit is further operable to determine a first of the absolute values that is greater than zero and does not exceed the threshold amount.

20. The remote sensor assembly of claim 17, wherein the processing circuit is further operable to determine a first of the absolute values that is greater than zero and does not exceed the threshold amount.

21. The remote sensor assembly of claim 1, wherein the processing circuit is further operable to determine a first difference between the sensor-derived value and the stored reference value that does not exceed the threshold amount.

* * * * *